UNITED STATES PATENT OFFICE.

WILLIAM BRIERLY AND NELSON R. MOORE, OF VANDERBILT, PENNSYLVANIA.

SOLDERING COMPOUND FOR VARIOUS METALS.

1,245,862.  Specification of Letters Patent.  Patented Nov. 6, 1917.

No Drawing.  Application filed February 9, 1915. Serial No. 7,079.

*To all whom it may concern:*

Be it known that we, WILLIAM BRIERLY and NELSON R. MOORE, citizens of the United States, residing at Vanderbilt, in the county of Fayette and State of Pennsylvania, have invented certain new and useful Improvements in Soldering Compounds for Various Metals; and we do hereby declare the following to be a full, clear, and exact description of the invention, such as will enable others skilled in the art to which at appertains to make and use the same.

This invention relates to soldering compounds for various metals and alloys in which the fusing point of the metal or alloy used in the compound is lower than the fusing point of the two parts of metal to be joined, and greater than the fusing point of the other three ingredients of the compound. In some cases a piece of metal whose density is the same as that of the two parts of metal to be joined will answer the purpose. One of the principal objects of the invention is to provide a compound for soldering gold or any other alloy, silver, brass, copper, iron or steel or any two pieces of metal, the fusing point of which is greater than the soldering compound.

In carrying out the invention, we take the following ingredients for a pound of the soldering compound, and mix by heating:

Borax _____ 5 ounces,
Paraffin _____ 4½ ounces,
Vaseline _____ 4½ ounces,
A metal (of lower fusing point
  than the metal to be soldered__ 2 ounces.

In preparing the composition we prefer to use the soldering metal in the form of filings but the finely divided particles of the soldering metal may be in any desired form. The soldering metal, the borax, the paraffin and the vaseline are thoroughly mixed under the application of sufficient heat to melt the paraffin and the vaseline without melting the metal or the borax. When the ingredients of the soldering compound are thus mixed in the form of a paste, the soldering compound is ready for use.

Various changes may be made in the relative proportions of the parts without departing from the spirit and scope of the invention as defined in the claim. For instance, less borax will form a better solder for gold.

If the soldering compound is to be used for uniting gold or its alloys, the metal to be used in the soldering compound is gold.

If the soldering compound is to be used for uniting two pieces of silver, gold, brass, copper, iron or steel, silver may be used in addition to the borax, paraffin, and vaseline.

If the soldering compound is to be used for copper, brass, iron, or steel, brass may be used, and if steel is to be soldered, steel may be used.

It will be understood, however, whatever metal is added to the three other ingredients of the soldering compound, the compound as a whole must be of lower fusing point than the two pieces of metal to be soldered together.

From the foregoing it will be obvious that the soldering compound contains ingredients of comparatively low cost, and that the soldering compound is available for various kinds of metal, and that a good reliable union of the parts is formed by using the compound in the ordinary way.

What is claimed is:—

A soldering compound consisting of a paste and comprising finely divided soldering metal two (2) ounces, borax five (5) ounces, paraffin four and one-half (4½) ounces, and vaseline four and one-half (4½) ounces.

In testimony whereof we affix our signatures in presence of two witnesses.

WILLIAM BRIERLY.
NELSON R. MOORE.

Witnesses:
  R. E. MCLAUGHLIN,
  J. C. MOORE.